(12) United States Patent
Chen

(10) Patent No.: US 9,628,738 B2
(45) Date of Patent: Apr. 18, 2017

(54) MOTION DETECTION IMAGE SENSORS AND METHODS FOR CONTROLLING A MOTION DETECTION IMAGE SENSOR

(71) Applicant: Nanyang Technological University, Singapore (SG)

(72) Inventor: Shoushun Chen, Singapore (SG)

(73) Assignee: Nanyang Technological University, Singapore (SG)

(*) Notice: Subject to any disclaimer, the term of this patent is extended or adjusted under 35 U.S.C. 154(b) by 0 days.

(21) Appl. No.: 14/763,667

(22) PCT Filed: Jan. 21, 2014

(86) PCT No.: PCT/SG2014/000023
§ 371 (c)(1),
(2) Date: Jul. 27, 2015

(87) PCT Pub. No.: WO2014/120088
PCT Pub. Date: Aug. 7, 2014

(65) Prior Publication Data
US 2015/0365617 A1     Dec. 17, 2015

Related U.S. Application Data

(60) Provisional application No. 61/759,044, filed on Jan. 31, 2013.

(51) Int. Cl.
*H04N 5/335* (2011.01)
*H04N 5/378* (2011.01)
*H04N 5/3745* (2011.01)
*G02B 5/20* (2006.01)

(52) U.S. Cl.
CPC ............. *H04N 5/378* (2013.01); *G02B 5/204* (2013.01); *H04N 5/3745* (2013.01)

(58) Field of Classification Search
CPC ................................ H04N 5/378; G02B 5/204
See application file for complete search history.

(56) References Cited

U.S. PATENT DOCUMENTS 6,660,989 B2 * 12/2003 Guo ....................... H04N 3/155
                                                                   250/208.1
2006/0197664 A1   9/2006 Zhang et al.
2008/0251721 A1  10/2008 Ueno

OTHER PUBLICATIONS

Ess, D. V.; "Understanding PSoC® 1 Switched Capacitor Analog Blocks"; May 29, 2007-2014. Retrieved from http://www.cypress.com/file/42191/download; p. 6.*
Razavi, B.; "Design of Analog CMOS Integrated Circuits"; 2001; McGraw-Hill; pp. 405-409.*
Ivanov YA, Bobick AF. 2000. Recognition of Visual Activities and Interactions by Stochastic Parsing. IEEE 22:852-872.
(Continued)

*Primary Examiner* — Gary C Vieaux
(74) *Attorney, Agent, or Firm* — Alston & Bird LLP

(57) ABSTRACT

According to various embodiments, an image sensor may be provided. The image sensor may include: a plurality of pixel cells, each pixel cell configured to convert incident light to an electric signal indicating the intensity of the incident light; a pixel determination circuit configured to determine a pixel cell of the plurality of pixel cells based on light incident to the plurality of pixel cells; and an output circuit configured to output the electrical signal of the determined cell.

20 Claims, 3 Drawing Sheets

(56) References Cited

OTHER PUBLICATIONS

Valera M, Velastin SA. 2005. Intelligent distributed surveillance systems: a review. IEE Proc.-Vis. Image Signal Process 152:192-204.
Chiasserini CF, Magli E. 2004. Energy-Efficient Coding and Error Control for Wireless Video-Surveillance Networks. Telecommunication Systems 26:369-387.
Hu W, Tan T, Wang L, Maybank S. 2004. A Survey on Visual Surveillance of Object Motion and Behaviors. IEEE 34: 334-352.
Arampatzis Th, Lygeros J, Manesis S. 2005. A Survey of Applications of Wireless Sensors and Wireless Sensor Networks. IEEE 719-724.
Chen S, Bermak A, Wang Y. 2011. A CMOS Image Sensor With On-Chip Image Compression Based on Predictive Boundary Adaptation and Memoryless QTD Algorithm. IEEE 19:538-547.
Chen S, Tang W, Zhang X, Culurciello E. 2012. A 64×64 Pixels UWB Wireless Temporal-Difference Digital Image Sensor. IEEE 20:2232-2240.
Zhao B, Zhang X, Chen S, Low KS, Zhuang H. 2012. A 64×64 CMOS Image Sensor with On-Chip Moving Object Detection and Localization. 22:581-588.
International Search Report and Written Opinion from International Application No. PCT/SG2014/000023 dated Feb. 19, 2014.

\* cited by examiner

MOTION DETECTION IMAGE SENSORS AND METHODS FOR CONTROLLING A MOTION DETECTION IMAGE SENSOR

CROSS-REFERENCE TO RELATED APPLICATIONS

The present application claims the benefit of the U.S. Provisional Patent Application No. 61/759,044 filed on 31 Jan. 2013, the entire contents of which are incorporated herein by reference for all purposes.

TECHNICAL FIELD

Embodiments relate generally to image sensors and methods for controlling an image sensor.

BACKGROUND

In a CMOS camera, images are read-out using a clock, which switches the multiplexer from one pixel to another, reading a voltage value after a fixed integration interval. Images are therefore produced by sequentially scanning the array using column and row scanners. Once the image is captured further signal processing can be performed by first buffering the entire frame before processing each pixel value sequentially. The cameras have significantly influenced the way we store and process image information in a matrix form. This format is simple and practical for image storage, but it is not ideal for image processing and feature-extraction. The reason is that intensity-based images contain a very high level of redundancy. Pixel intensity is useful for human interpretation and retrieval, but is a burden for machine-based processing. Therefore, there may be a need for efficient image sensors.

SUMMARY

According to various embodiments, an image sensor may be provided. The image sensor may include: a plurality of pixel cells, each pixel cell configured to convert incident light to an electric signal indicating the intensity of the incident light; a pixel determination circuit configured to determine a pixel cell of the plurality of pixel cells based on light incident to the plurality of pixel cells; and an output circuit configured to output the electrical signal of the determined cell.

According to various embodiments, a method for controlling an image sensor may be provided. The method may include: controlling a plurality of pixel cells, each pixel cell converting incident light to an electric signal indicating the intensity of the incident light; determining a pixel cell of the plurality of pixel cells based on light incident to the plurality of pixel cells; and outputting the electrical signal of the determined cell.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1A:
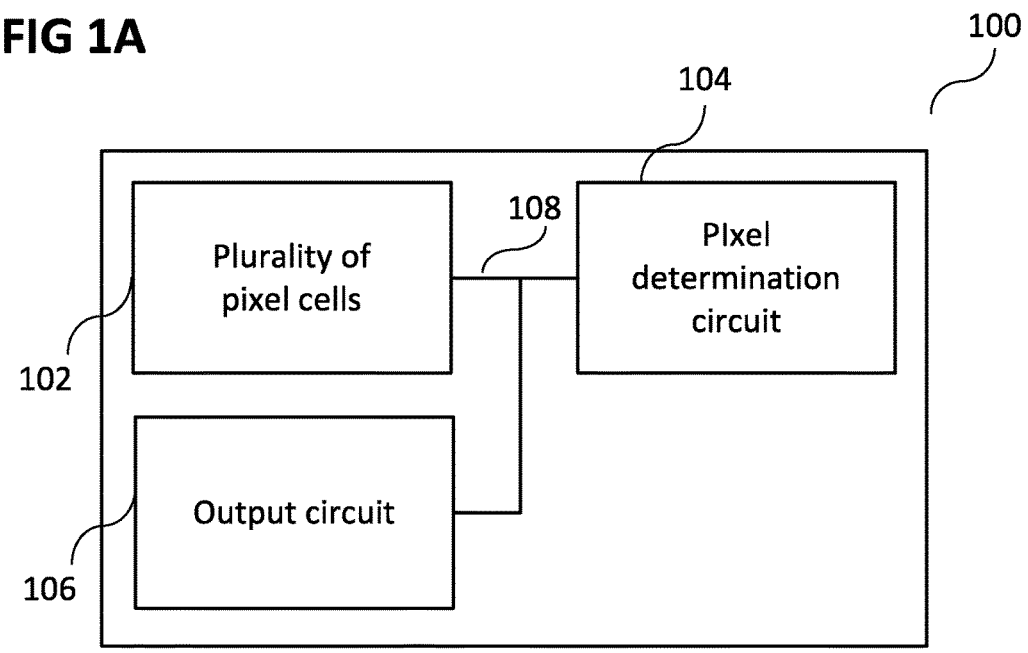
FIG. 1A shows an image sensor in accordance according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

In this context, the image sensor as described in this description may include a memory which is for example used in the processing carried out in the image sensor. A memory used in the embodiments may be a volatile memory, for example a capacitor, a capacitor in series with a resistor, or a DRAM (Dynamic Random Access Memory), or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The last decade has witnessed significant technological advancement of CMOS (Complementary Metal Oxide Semiconductor) image sensors. CMOS imagers are undoubtedly gaining more territory when compared to their CCD (charge-coupled device) counterparts. This may be due to their inherent advantages of low power, low cost and more importantly their ability to integrate image capture together with on-chip image processing. Deep sub-micron technologies have contributed significantly to paving the way to novel on-chip processing. The concept of "camera-on-a-chip" has already been introduced in the 90's and new development has seen more complex image processing.

In a CMOS camera, images are read-out using a clock, which switches the multiplexer from one pixel to another, reading a voltage value after a fixed integration interval. Images are therefore produced by sequentially scanning the array using column and row scanners. Once the image is captured further signal processing can be performed by first buffering the entire frame before processing each pixel value sequentially. The cameras have significantly influenced the way we store and process image information in a matrix form. This format is simple and practical for image storage, but it is not ideal for image processing and feature-extraction. The reason is that intensity-based images contain a very high level of redundancy. Pixel intensity is useful for human interpretation and retrieval, but is a burden for machine-based processing. Also sequential image readout negatively affects image processing hardware, because large amounts of unimportant data have to be read and processed before the features of interest are obtained. In fact, the first step of many computer vision algorithms is to remove the background and extract object edges or motion contours.

At least the following limitations are associated with commonly used systems:

1) Trade-offs exist between the frame-rate and image resolution. In order to capture high speed motion, the sensor has to run at very high frame rate, i.e. more than 500 frames/second. Due to limited readout bandwidth, scanning read-out strategies may soon fall short of meeting the requirements of higher resolution and high fame rate.

2) It is a big challenge to transmit, store, and process the huge amount of video data in real-time. Only wired data link can afford the bandwidth requirement. The complete system has to be supported by a very powerful computer, and sometimes expensive specialized storage/computing hardware.

According to various embodiments, the sensor does not need to be queried for information; instead, the sensor may push information to the receiver once the sensor has gathered the information. The architecture according to various embodiments can filter out most of the redundant information at the sensor and output only a set of pre-specified features of interest (i.e. fast motion). According to various embodiments, the sensor output does not produce 'image frames' but rather a stream of 'fast enough' pixels.

FIG. 1A shows an image sensor 100 according to various embodiments. The image sensor 100 may include a plurality of pixel cells 102. Each pixel cell may be configured to convert incident light to an electric signal indicating the intensity of the incident light. The image sensor 100 may further include a pixel determination circuit 104 configured to determine a pixel cell of the plurality of pixel cells 102 based on light incident to the plurality of pixel cells 102. The image sensor 100 may further include an output circuit 106 configured to output the electrical signal of the determined cell. The plurality of pixel cells 102, the pixel determination circuit 104, and the output circuit 106 may be coupled by a coupling 108, for example by an electrical coupling or by an optical coupling, for example a cable or a bus.

In other words, the image sensor 100 may only output pixel values of pixel cells, for which the incident light to the pixel cells fulfills a pre-determined criterion.

According to various embodiments, each pixel cell may include: a photo detector configured to convert incident light to an electric signal indicating the intensity of the incident light; a criterion determination circuit 230 configured to determine whether the incident light fulfills a pre-determined criterion; and an indication circuit 232 configured to transmit an indication indicating that the incident light fulfills the pre-determined criterion if the incident light fulfills the pre-determined criterion.

According to various embodiments, the criterion determination circuit 230 (of each pixel cell) may include or may be a light change detector 204.

According to various embodiments, the criterion determination circuit 230 (of each pixel cell) may include or may be a high-pass filter 206 configured to filter an output of the light change detector 204 (of the pixel cell).

According to various embodiments, the criterion determination circuit 230 (of each pixel cell) may include or may be a tunable high-pass filter (e.g., comprised of high-pass filter 206 and resistor 208).

According to various embodiments, each pixel cell may include a cut-off frequency input line configured to receive information indicating a cut-off frequency of the high-pass filter 206 (of the pixel cell).

According to various embodiments, the criterion determination circuit 230 (of each pixel cell) may include or may be a comparator 210.

According to various embodiments, the criterion determination circuit 230 (of each pixel cell) may include or may be a high-pass filter 206 configured to filter an output of the light change detector 204. According to various embodiments, the comparator 210 (of each pixel cell) may be configured to compare an output of the high-pass filter 206 with a pre-determined comparator threshold.

According to various embodiments, each pixel cell may include a comparator threshold input line 224 configured to receive information indicating the comparator threshold.

According to various embodiments, the indication circuit 232 (of each pixel cell) may be configured to transmit a signal indicating that the incident light fulfills the pre-determined criterion if the output of the high-pass filter 206 is higher than the pre-determined comparator threshold.

According to various embodiments, the pixel determination circuit 104 may be configured to determine the pixel cell of the plurality of pixel cells 102 as a pixel cell for which the light incident to the pixel cell fulfills a pre-determined criterion.

According to various embodiments, the pixel determination circuit 104 may include: a row arbiter configured to process a row of pixel cells in which at least one pixel cell fulfills the pre-determined criterion.

According to various embodiments, the pixel determination circuit 104 may include: a column arbiter configured to process a column of pixel cells in which at least one pixel cell fulfills the pre-determined criterion.

According to various embodiments, the pre-determined criterion may include or may be a criterion based on a change of the incident light.

Figure 1B:
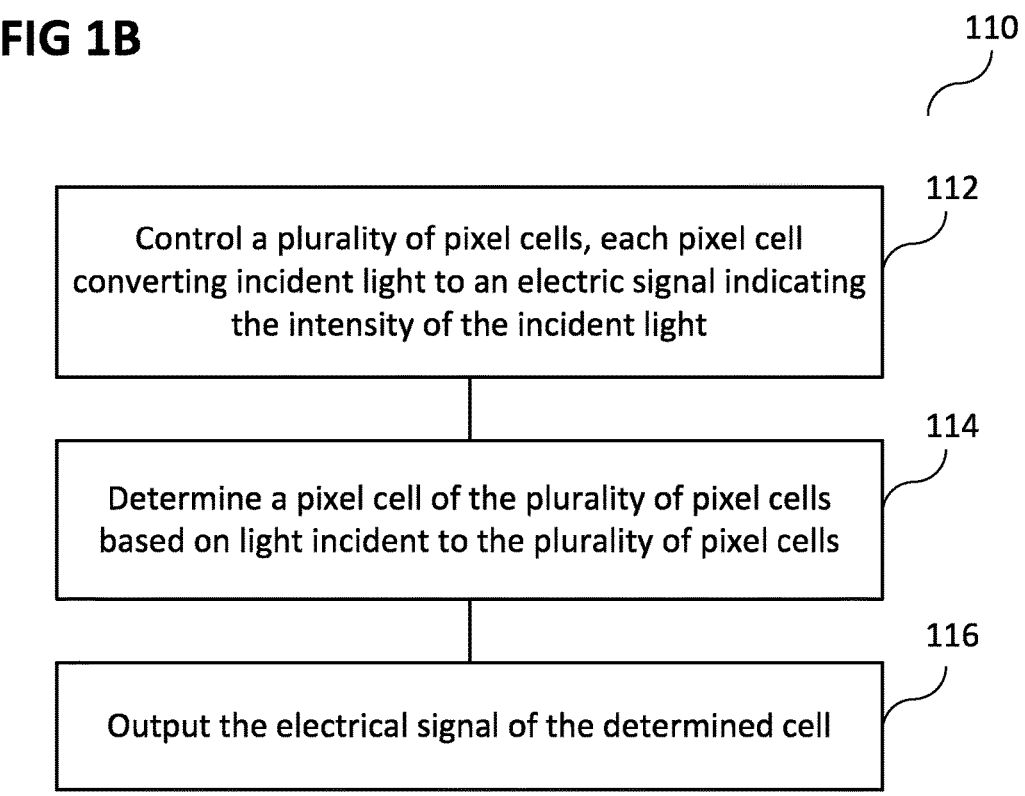
FIG. 1B shows a flow diagram illustrating a method for controlling an image sensor in according to various embodiments.

FIG. 1B shows a flow diagram 110 illustrating a method for controlling an image sensor according to various embodiments. In 112, a plurality of pixel cells may be controlled. Each pixel cell may convert incident light to an electric signal indicating the intensity of the incident light. In 114, a pixel cell of the plurality of pixel cells may be determined based on light incident to the plurality of pixel cells. In 116, the electrical signal of the determined cell may be output.

According to various embodiments, controlling of each pixel cell may include: converting incident light to an electric signal indicating the intensity of the incident light; determining whether the incident light fulfills a pre-determined criterion; and transmitting an indication indicating that the incident light fulfills the pre-determined criterion if the incident light fulfills the pre-determined criterion.

According to various embodiments, the determining whether the incident light fulfills a pre-determined criterion may include or may be detecting a light change of the incident light.

According to various embodiments, the determining whether the incident light fulfills a pre-determined criterion may include or may be high-pass filtering a detected light change signal.

According to various embodiments, the high-pass filtering may include or may be using a tunable high-pass filter.

According to various embodiments, controlling of each pixel cell may include: receiving information indicating a cut-off frequency of the high-pass filter.

According to various embodiments, the determining whether the incident light fulfills a pre-determined criterion may include or may be using a comparator.

According to various embodiments, the determining whether the incident light fulfills a pre-determined criterion may include or may be high-pass filtering a detected light change signal. According to various embodiments, the determining whether the incident light fulfills a pre-determined criterion may include or may be comparing an output of the high-pass filtered signal with a pre-determined comparator threshold.

According to various embodiments, controlling of each pixel cell may include: receiving information indicating the comparator threshold.

According to various embodiments, transmitting the indication may include or may be transmitting a signal indicating that the incident light fulfills the pre-determined criterion if the output of the high-pass filtering is higher than the pre-determined comparator threshold.

According to various embodiments, determining the pixel cell of the plurality of pixel cells may include or may be determining the pixel cell of the plurality of pixel cells as a pixel cell for which the light incident to the pixel cell fulfills a pre-determined criterion.

According to various embodiments, determining the pixel cell of the plurality of pixel cells may include or may be processing a row of pixel cells in which at least one pixel cell fulfills the pre-determined criterion.

According to various embodiments, determining the pixel cell of the plurality of pixel cells may include or may be processing a column of pixel cells in which at least one pixel cell fulfills the pre-determined criterion.

According to various embodiments, the pre-determined criterion may include or may be a criterion based on a change of the incident light.

According to various embodiments, a high-speed motion detection camera may be provided.

The sensor may provide high-speed pixel-parallel motion detection at the focal plane. Each pixel in the sensor may individually monitor the slope of change in light intensity and may spike an event if a threshold is reached. An address-encoder may generate a unique binary address for each pixel whenever it spikes. A bus may transmit these addresses to the receiving chip, where an address decoder may interpret the corresponding location. The output of the sensor may be not a frame, but may be a stream of asynchronous digital events. Therefore, the speed of the sensor may not be limited by any traditional concept such as exposure time and frame rate. It may detect fast motion which is traditionally captured by expensive, high speed cameras running at thousands frames per second, but with hundreds times less of data, which may reduce the signal processing cost. With the sensor according to various embodiments, signal processing costs may be reduced. The sensor may report the positions of those pixels on the trajectory of the motion object when it travels through the field of view.

Each of the pixel-level circuits may be equipped with a tuneable motion-speed filter. It may provide for example for the following:

1) Filter slow motion. When the light intensity changes slowly, it won't be able to trigger digital events. Adjusting the passband of the filter may produce different motion-speed response and may result in a useful feature of speed-selectivity. As such, the sensor may be tuned to catch motion objects with speed faster than a pre-determined threshold, and may ignore slower objects at the same time.

2) Snapshot-and-hold. Motion detection may be disabled after the first event is received. Each pixel in the sensor may individually monitor the slope of change in light intensity and may spike an event if a threshold is reached. As long as the moving object is fast enough, the sensor may trigger many pixels on the focal plane in parallel, and may store the motion events in the pixel-level memory. When the external receiver reads the first event, the motion-filter may be set to an infinite fast threshold so that the sensor does not response to any new motion. As such, the sensor can be used for extremely high-speed motions that may produce a lot of concurrent events exceeding the communication bandwidth of the sensor, and for scenarios that the objects are moving at variable speed so that there does not exist a fixed observation interval.

According to various embodiments, a scheme of motion detection on the focal plane of an image sensor may be provided. According to various embodiments, an event driven scheme or a pixel driven scheme may provide efficient allocation of the output bandwidth to only active pixels.

Figure 2:
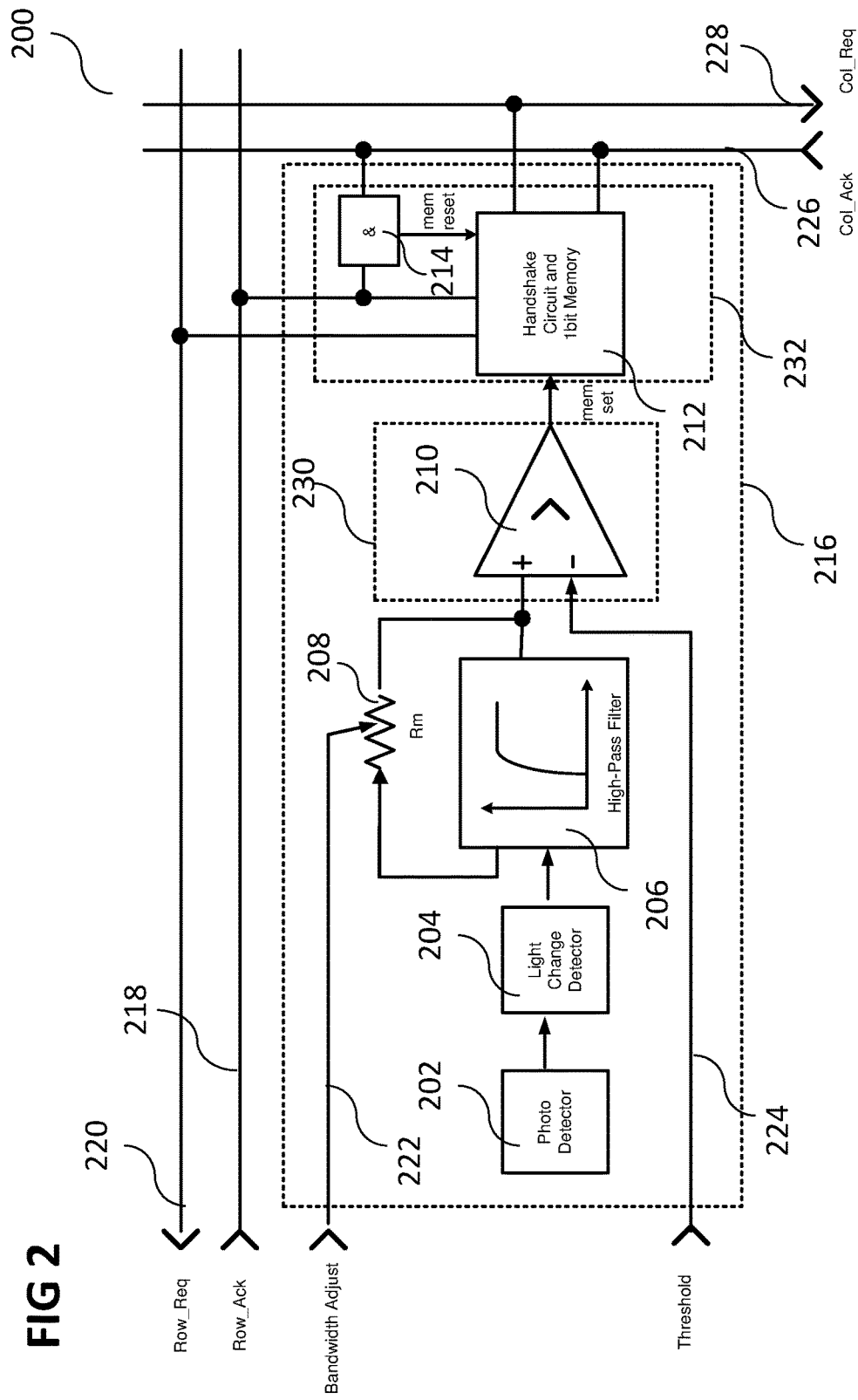
FIG. 2 shows a pixel architecture according to various embodiments.

FIG. 2 shows a pixel architecture 200 (in other words: a sensor architecture) according to various embodiments. A pixel core circuit 216 (which may also be referred to as a pixel cell) may include a few building blocks, namely a photo detector 202, a light-change detector 204, a (for example programmable) high-pass filter 206 (for example with tunable resistor/resistors, for example resistor 208), a comparator 210, a handshaking circuit and a 1-bit memory (shown as a circuit 212). A row request line 220, a row acknowledgement line 218, a column request line 228, and a column acknowledgement line 226 may be provided. An AND circuit 214 may be provided to provide a memory reset signal to the handshaking circuit and a 1-bit memory 212, if both the row acknowledgment line 218 and the column acknowledgment line 226 are logical high (for example 1). A threshold signal 224 may be provided to the comparator 210. A bandwidth adjust line 222 may provide a bandwidth adjust signal to a tunable resistor 208, and the output of the tuneable resistor 208 may be provided to the comparator 210 for comparison with the threshold provided by threshold line 224. It will be understood that an on-chip resistor may be implemented in many ways, for example, it may be a transistor operating in linear region, or a strip of doped polysilicon. One way to make a tunable on-chip resistor is to use a linear-region transistor, and then change its gate voltage.

In the following, pixel operation according to various embodiments will be described. Within each pixel, the "light-change detector" unit 204 may continuously monitor the change in illumination intensity. The output current of the photo detector 202 may be proportional to the illumination. When a static scene is projected onto the photo detector array, the output current of the photo detector 202 may be constant over time. When there is any change in the light intensity, the "light-change detector" 204 may report an electrical signal, in the mode of either voltage or current. The high-pass filter 206 may attenuate all slow changes outside its passband. Adjusting the strength of the resistor/resistors may tune the passband of the filter and hence may realize a useful feature of speed-selectivity. A digital event may be generated when the output of the filter 206 is above the threshold voltage/current of a comparator 210.

According to various embodiments, the pixel area may be bigger than that of a conventional APS and may results in a larger chip size. However, the sensor chip may only take a very small fraction (for example less than 1%) of the overall high speed imaging system, and the latter is where various embodiments bring down the cost.

Figure 3:
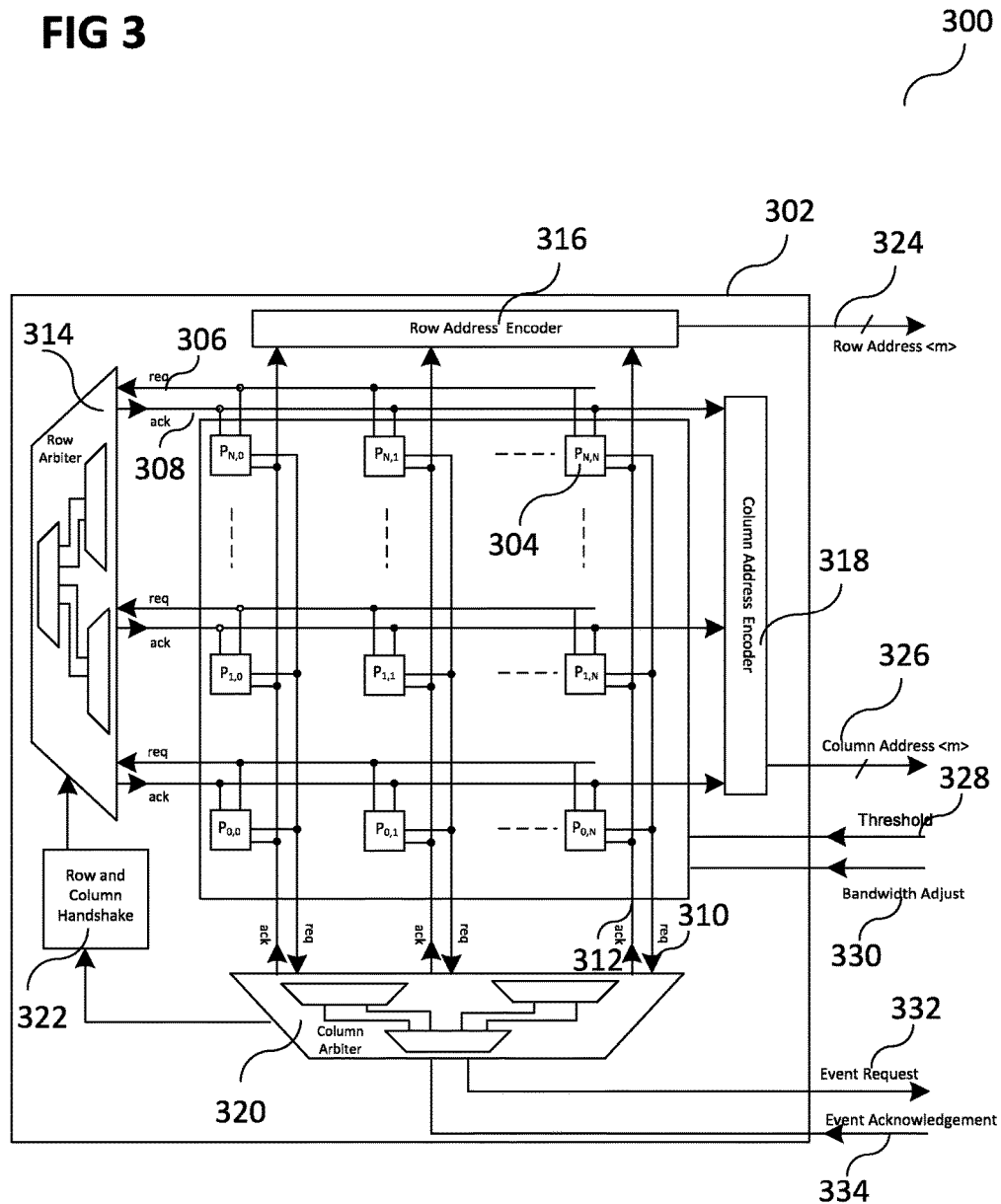
FIG. 3 shows an array architecture according to various embodiments.

FIG. 3 shows an array architecture 300 according to various embodiments. In a device 302 according to various embodiments, pixels may be organized into rows and columns sharing the same request and acknowledgment buses. An exemplary pixel cell is indicated by reference sign 304. It will be understood that any number of pixel cells may be provided, and although in FIG. 3, an N×N array (with an integer number N) is shown, also an N×M array (with different integer number N and M) may be provided.

For the pixel cell 304, a row request line 306, a row acknowledgement line 308, a column request line 310, and a column acknowledgement line 312 may be provided. A row address encoder 316 and a column address encoder 318 may be configured to generate the address of the acknowledged event. The row address encoder 316 may output the row address on a row address line 324 (which for example may be a bus with m bits, like indicated by <m> in FIG. 3). It will be understood that N may be equal to $2^m$. The row column encoder 318 may output the column address on a row address line 326.

The roll-off frequency of the high-pass filter may be programmed from DC (direct current; in other words: frequency of zero) to infinity (see FIG. 3). A threshold may be provided by threshold line 328, and a bandwidth may be provided by bandwidth line 330. A global "bandwidth adjust" circuit (not shown in FIG. 3) may be configured to tune the roll-off frequency of the high-pass filter in each pixel.

In the following, array operation according to various embodiments will be described. When a pixel reports an event, which for example corresponds to a fast change in light intensity, the pixel may asynchronously self-set a 1-bit memory to an active state until the event is being readout (which may be an implementation of the indication circuit 232 of the pixel cell transmitting the indication indicating that the incident light fulfills the pre-determined criterion). Two-dimensional handshaking circuits, so-called arbiters (for example a row arbiter 314 and a column arbiter 320), may asynchronously process the digital events. A request signal may first be sent to the row arbiter 314 through a row based bus signal. The row arbiter 314 may process all the row requests and may grant an acknowledgment signal to a single row. At this stage, all pixels that generated an event within the acknowledged row may send a second request signal to the column arbiter 320 and when it is further acknowledged, the pixel may clear its status by self-reset its 1-bit memory. The combination of row and column acknowledgements may be exploited by the row and column encoders in order to generate the address of the active pixel.

In the following, a row and column pipeline according to various embodiments will be described. When one row, for example denoted as row_A, for sake of clarity, is being acknowledged, the fired pixels within row_A may be readout one by one. In order to maximize the pipeline and avoid the time delay for the row arbitration circuits to make a decision about the next row to be processed, the column arbitration circuits may hold the requests from row_A and acknowledge all the pixel concurrently. A handshaking scheme between the row and column arbiters (for example provided by a row and column handshake circuit 322) may notify the row arbiter to pre-process another row's request and get ready. Once the column arbiter has finished processing the queue, the row arbitration circuits may immediately select another row to start a new cycle of readout.

An event request line 332 and an event acknowledgement line 334 may be provided. These two lines may form a pair of global handshaking signals. They may be used to communicate to the external world (a receiver chip, for example). The receiver may receive the "request" together with the encoded address 328 and 324. The signal sequence may be as follows: "request generation"-→"acknowledgement generation"→"request withdraw"→"acknowledgement withdraw".

According to various embodiments, an image sensor (or a vision sensor) may be provided. According to various embodiments, an image sensor may include: an array of pixels configured to convert incident light to electrical current whose magnitude depends on the intensity of the incident light; in-pixel circuitries configured to detect the slope of change in the light intensity, filtering the slow changes, and reporting a digital signal when the change is faster than a threshold. According to various embodiments, adjusting the pass-band of the filter may produce different motion-speed responses and may result in a feature of speed-selectivity. As such, the sensor may be tuned to catch motion objects with speed faster than a pre-determined threshold. According to various embodiments, the sensor may capture any slow motion when the roll-off frequency of the filter is set to DC. According to various embodiments, the sensor may stop responding to any motion when the roll-off frequency of the filter is set to infinity.

According to various embodiments, the high-pass filter and the comparator may be merged into one building block.

According to various embodiments, the high-pass filter may include several tunable resistors.

According to various embodiments, the tunable resistors in the high-pass filter may be implemented using transistors.

According to various embodiments, the pixel may self-reset and may start another round of motion detection after it reports an event.

According to various embodiments, the pixels may be readout by scanners or decoders, which may switch the multiplexer from one pixel to another.

According to various embodiments, devices and methods may be provided to capture fast motion with minimum amount of data. Motion detection system may employ CCD or CMOS Active Pixel Sensors (APS). In order to capture high speed motion, the sensor has to run at very high frame rate, i.e. more than 500 frames/second. Massive quantities of primitive, unimportant image data have to be transmitted and processed before the features of interest are obtained. Therefore, the complete system has to be supported by a very powerful computer, and sometimes expensive specialized co-processing hardware. Moreover, trade-offs exist between frame-rate and image resolution. Instead of capturing raw images, the image sensor according to various embodiments provides high-speed pixel-parallel motion detection at the focal plane. Each pixel in the sensor may individually monitor the changes in light intensity and may report an event if a threshold is reached. The output of the sensor may be not a frame, but a stream of asynchronous digital events. Therefore the speed of the sensor according to various embodiments is not limited by any traditional concept such as exposure time and frame rate. In addition, the sensor according to various embodiments can be tuned to catch motion objects with speed faster than a certain threshold.

A camera according to various embodiments (for example including a sensor according to various embodiments) may provide a low cost full-system solution which is currently very expensive. Main applications may include industrial product inspection, high speed flaw/defect inspection, or high speed processing monitoring.

The devices and methods according to various embodiments may provide that computational cost may be very low, and that real-time processing or wireless communication may be very easy.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An image sensor comprising:
   a plurality of pixel cells, each pixel cell configured to convert incident light to an electric signal indicating the intensity of the incident light;
   a pixel determination circuit configured to determine a pixel cell of the plurality of pixel cells based on light incident to the plurality of pixel cells; and
   an output circuit configured to output the electrical signal of the determined cell;
   wherein each pixel cell comprises:
      a photo detector configured to convert incident light to an electric signal indicating the intensity of the incident light;
      a criterion determination circuit configured to determine whether the incident light fulfills a pre-determined criterion; and
      an indication circuit configured to transmit an indication indicating that the incident light fulfills the pre-determined criterion if the incident light fulfills the pre-determined criterion;
   wherein the criterion determination circuit comprises a light change detector; and
   wherein the criterion determination circuit comprises a high-pass filter configured to filter an output of the light change detector;
   wherein the light change detector is an electrical circuit configured to generate an electrical signal based on the change in the output current of the photo detector.

2. The image sensor of claim 1, wherein the criterion determination circuit further comprises a tunable high-pass filter.

3. The image sensor of claim 2, wherein each pixel cell further comprises a cut-off frequency input line configured to receive information indicating a cut-off frequency of the high-pass filter.

4. The image sensor of claim 1, wherein the criterion determination circuit further comprises a comparator.

5. The image sensor of claim 4, wherein the indication circuit is further configured to transmit a signal indicating that the incident light fulfills the pre-determined criterion if the output of the high-pass filter is higher than the pre-determined comparator threshold.

6. The image sensor of claim 4, wherein the comparator is configured to compare an output of the high-pass filter with a pre-determined comparator threshold.

7. The image sensor of claim 6, wherein each pixel cell further comprises a comparator threshold input line configured to receive information indicating the comparator threshold.

8. The image sensor of claim 1, wherein the pixel determination circuit is further configured to determine the pixel cell of the plurality of pixel cells as a pixel cell for which the light incident to the pixel cell fulfills a pre-determined criterion.

9. The image sensor of claim 8, wherein the pixel determination circuit further comprises:
   a row arbiter configured to process a row of pixel cells in which at least one pixel cell fulfills the pre-determined criterion.

10. The image sensor of claim 8, wherein the pixel determination circuit further comprises:
    a column arbiter configured to process a column of pixel cells in which at least one pixel cell fulfills the pre-determined criterion.

11. A method for controlling an image sensor, the method comprising:
    controlling a plurality of pixel cells, each pixel cell converting incident light to an electric signal indicating the intensity of the incident light;
    determining a pixel cell of the plurality of pixel cells based on light incident to the plurality of pixel cells; and
    outputting the electrical signal of the determined cell;
    wherein controlling of each pixel cell comprises:
       converting incident light to an electric signal indicating the intensity of the incident light;
       determining whether the incident light fulfills a pre-determined criterion; and
       transmitting an indication indicating that the incident light fulfills the pre-determined criterion if the incident light fulfills the pre-determined criterion;
    wherein the determining whether the incident light fulfills a pre-determined criterion comprises detecting a light change, using a light change detector, of the incident light; and
    wherein the determining whether the incident light fulfills a pre-determined criterion comprises high-pass filtering a detected light change signal;
    wherein the light change detector is an electrical circuit configured to generate an electrical signal based on the change in the output current of the photo detector.

12. The method of claim 11, wherein the high-pass filtering comprises using a tunable high-pass filter.

13. The method of claim 12, wherein controlling of each pixel cell further comprises:
    receiving information indicating a cut-off frequency of the high-pass filter.

14. The method of claim 11, wherein the determining whether the incident light fulfills a pre-determined criterion further comprises using a comparator.

15. The method of claim 14, wherein transmitting the indication further comprises transmitting a signal indicating that the incident light fulfills the pre-determined criterion if the output of the high-pass filtering is higher than the pre-determined comparator threshold.

16. The method of claim 14, wherein the determining whether the incident light fulfills a pre-determined criterion further comprises comparing an output of the high-pass filtered signal with a pre-determined comparator threshold.

17. The method of claim 16, wherein controlling of each pixel cell further comprises:
   receiving information indicating the comparator threshold.

18. The method of claim 11, wherein determining the pixel cell of the plurality of pixel cells comprises determining the pixel cell of the plurality of pixel cells as a pixel cell for which the light incident to the pixel cell fulfills a pre-determined criterion.

19. The method of claim 18, wherein determining the pixel cell of the plurality of pixel cells comprises processing a row of pixel cells in which at least one pixel cell fulfills the pre-determined criterion.

20. The method of claim 18, wherein determining the pixel cell of the plurality of pixel cells comprises processing a column of pixel cells in which at least one pixel cell fulfills the pre-determined criterion.

* * * * *